[54] APPARATUS FOR READING OUT INFORMATION DATA

[75] Inventor: Louis Achilles Meeussen, Mortsel, Belgium

[73] Assignee: Agfa-Gevaert N.V., Mortsel, Belgium

[22] Filed: Sept. 24, 1971

[21] Appl. No.: 183,524

[30] Foreign Application Priority Data
Sept. 25, 1970 Germany .................. P 20 47 235.9

[52] U.S. Cl. . 250/219 D, 250/219 FR, 350/162 SF, 356/71
[51] Int. Cl. ........................................ G01n 21/30
[58] Field of Search ................... 356/71; 350/162 R, 350/162 SF; 250/219 FR, 219 D, 219 QA, 219 CR; 235/61.11 E

[56] References Cited
UNITED STATES PATENTS

| | | | |
|---|---|---|---|
| 3,592,547 | 7/1971 | Noble | 356/71 |
| 2,696,520 | 12/1954 | Bradley | 250/162 SF |
| 3,587,063 | 6/1971 | Lamberts | 350/162 SF |
| 3,248,552 | 4/1966 | Bryan | 250/219 CR |
| 3,153,222 | 10/1964 | Fomenko | 356/71 |
| 3,622,988 | 11/1971 | Caulfield | 350/162 SF |
| 3,571,603 | 3/1971 | Bryant | 356/71 |
| 3,652,162 | 3/1972 | Noble | 356/71 |

*Primary Examiner*—James W. Lawrence
*Assistant Examiner*—D. C. Nelms
*Attorney*—William J. Daniel

[57] ABSTRACT

Apparatus for reading out information data stored on a transparent carrier in the form of diffraction screens by means of which the individual areas of the information carrier are read out separately.

The apparatus comprises a first lens shaped as a screen plate having a plurality of spheric lens elements in the focus of each of which a source of light giving a substantial point-like beam of light can be activated and a second lens which is located behind the information carrier and which focuses the transmitted light in a plane provided with photo-electric sensing devices.

9 Claims, 2 Drawing Figures

PATENTED JUL 31 1973 3,749,922

APPARATUS FOR READING OUT INFORMATION DATA

The present invention relates to an apparatus for reading out information data stored on a transparent carrier in the shape of diffraction gratings having individual gratings constants and/or individual screen azimuth angles, with a source of substantially monochromatic light giving a substantial point-like beam of light, with a first lens, collimating the light, and a second lens, which is located behind the carrier and which focuses the transmitted light in a plane provided with photoelectric sensing devices.

In a known apparatus of said kind, the carrier has a number of individual and mutually adjacent areas provided with gratings designs which, due to the different azimuth angles or different gratings constants, give rise to light concentrations based on diffraction phenomena in the focal plane of the second lens. Since, however, only one source of light is provided on the optical axis of the arrangement, all areas of the information carrier are reproduced simultaneously in the evaluation plane. A selective interrogation is not possible with the aforesaid apparatus.

The present invention relates to an apparatus of the kind referred to in which the individual areas of the information carrier can be read out separately.

According to the invention, in such an apparatus there is provided as first lens a lens screen plate having a plurality of spherical lenses in the focus of each of which a source of light giving a substantial point-like beam of light can be activated.

Due to the high speed at which the light beam of the cathode ray tube can be directed to different spots of the light screen, individual areas of the information carrier can be read out in rapid succession through corresponding individual spheric lenses of tle screen plate.

According to an embodiment of the present invention the information carrier for use with the apparatus according to the invention is divided into areas corresponding in size and location to the lens elements of the screen plate and on each said area of the carrier one or more superimposed gratings, having different grating constants and/or different azimuth angles, are recorded.

Figure 1:
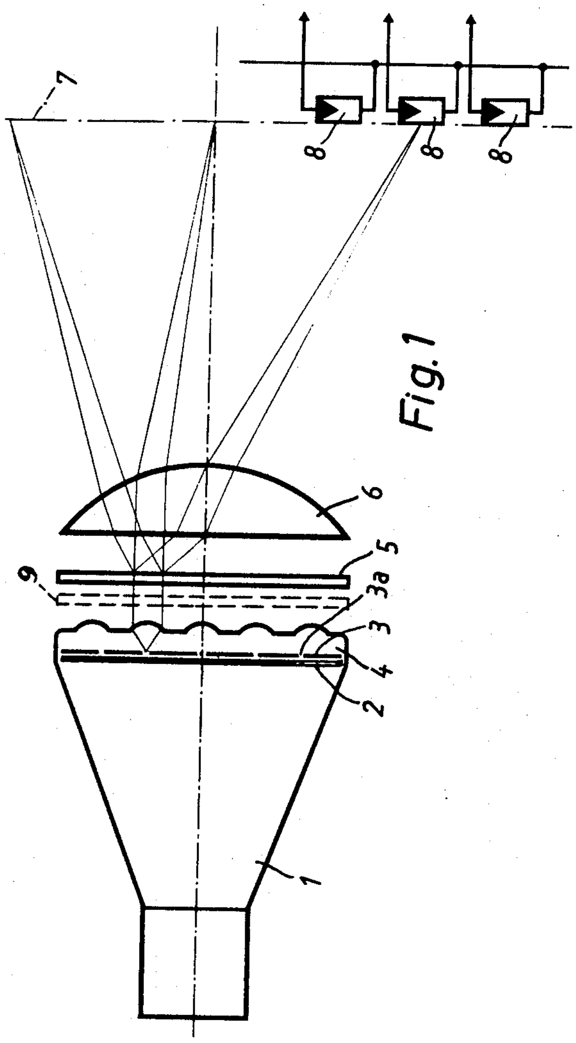
Figure 2:
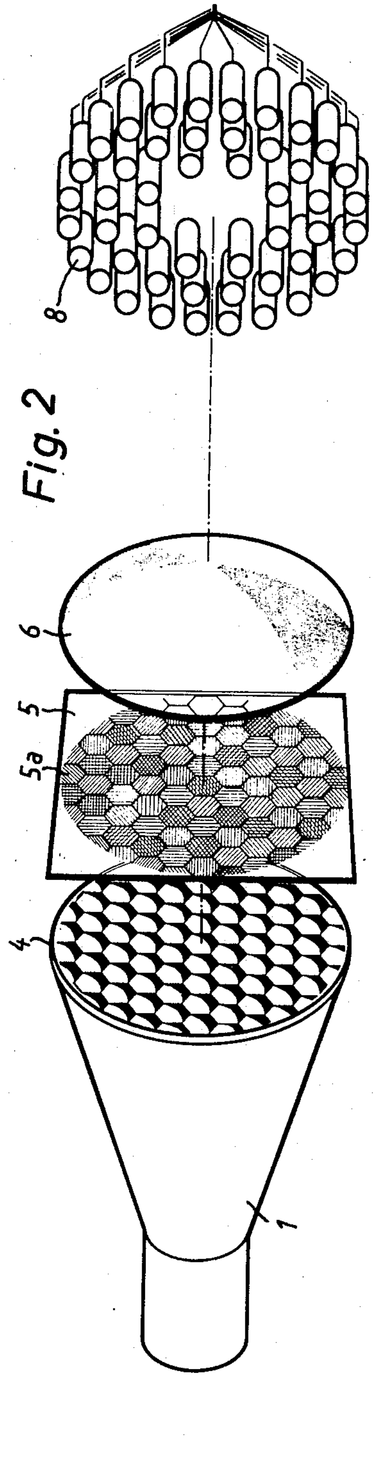

Other advantages and details will appear from the following description of an embodiment of the invention as illustrated in the attached drawings, wherein :

FIG. 1 represents diagrammatically a lateral view of the apparatus according to the invention, and FIG. 2 represents a perspective view of the apparatus according to FIG. 1.

In FIG. 1 a cathode ray tube 1 of known type is shown. Due to a suitable arrangement of its deflecting coils the cathode ray tube is appropriate to direct a sharply focused beam of light on the light screen 2. In contact with the light screen 2 there is a perforated plate or mask 3 having holes 3*a* in combination with a lens screen plate 4 which closes the cathode ray tube, each hole being coaxial to the optical axis of a lens element of the screen plate 4. The holes 3a are very small so that they may be practically considered as point-like sources. The focal distance of the lens elements of the screen plate 4 is determined so as to perfectly collimate the divergent light emanating from the holes 3*a*. The light source, the screen or the holes 3*a* are thus located in the focal plane of the lens components of the screen plate 4.

At a certain, not too great distance from the screen plate 4, there is a transparent information carrier 5 which, as may be seen on FIG. 2, is divided into hexagonal areas 5*a*, adjacent to one another, composing together the total area which is illuminated by the cathode ray tube 1 on the information carrier 5. In each individual area 5*a* are included diffraction screens with different aximuth angles and/or different grating constants, preferably drawn as phase gratings. Especially with phase gratings, the superimposed gratings do not interfere much one with another in as long as the diffraction power of the individual grating remains adjusted for mutual relation. The gratings constant of the individual gratings is chosen so as to ensure at least a definite minimum diffraction away from the optical axis. In connection with screen production, trend of density and optical path, as well as chemical production methods, more detailed information is given in German Pat. specification No. P 1 622 865. The areas 5*a* of the carrier 5 correspond in size and location to the individual lens elements of the screen plate 4.

A color filter 9 is preferably interposed between the lens plate 4 and the information carrier 5 in order to render the various light beams emanating from the tube assembly 1 substantially monochromatic. This filter can be of the so-called "band-pass" type which transmits only a narrow wavelength band of light.

In direction of the light beam behind the information carrier 5, a second lens 6 is located, which focuses the incoming light on an evaluation plane 7. In this plane a great number of photo-sensing devices (e.g., photodiodes or photoresistors 8) are provided in a matrix pattern arrangement. In the aforesaid embodiment the photo-sensing devices 8 are located on three circles of different diameter which are concentric to the optical axis. Each of the three diameters corresponds to a definite diffraction of the beam by a grating constant, so that in the information carrier 5 there are screens with three different grating constants. The grading of the aximuth angles in the individual areas of the information carrier 5 is designed so that in the plane 7 a distinct separation of the diffraction arrangements remains possible, i.e., that for gratings with a greater grating constant and thus greater diffraction power a greater arc of the circle is available, so that the azimuth angles can be finer graded correspondingly. In the present case, for the screens with the greater diffraction twelve photo-sensing devices are arranged on a half circle so that the grading of the azimuth angle amounts to 15° each time. On the inner circle the number of photo-sensing devices is only four on 180° so that the roughly structured screens are only turned over 45° in respect to one another.

The operation of the aforesaid apparatus is as follows :

The information carrier 5 is inserted between the screen plate 4 and the lens 6 in such a position that the areas 5*a* of the information support are located concentrically to the optical axes of the lens elements of the screen plate 4. Now, if by controlling the cathode ray tube 1, one of the holes 3*a* becomes illuminated, the collimated light beam of each diffraction screen is concentrated by the lens 6 (see FIG. 1) principally at the three spots of the plane 7. Those are the zero diffraction order approximately on the optical axis, which is the same for all screens, the first negative diffraction order deflected downwards and the first positive diffraction order deflected upwards. As the first positive and first negative diffraction orders are correlated, but are turned over 180° in respect of each other in the plane 7, the photo-sensing devices symmetrically located the one in respect of the other receive the same signal. Thus, at a sufficient light intensity, it is possible to do without e.g., the lower half of the photo-sensing matrix. In any case the double number of sensing devices for each signal increases the reliability and the intensity of the output signal. In each of the areas 5*a* 24 different signals can be stored, as also in each of the areas 5*a* 24 different screens can be superimposed the one on the other, the diffraction phenomena of said screens illuminating one photo-sensing device each in the upper half of the matrix 8. Such signal recording is possible for each of the areas 5*a*, so that the carrier 5 may be scanned at very high speed in connection with the control of the cathode ray.

Instead of the cathode ray tube, e.g., a laser, the light beam of which may be directed by a system of mirrors along the optical axes of the individual lens elements, may also be applied. The mirrors, however, to be controlled by mechanical means, have a greater inertia than the electron ray control, so that the cathode ray tube is superior for guide interrogating stores. To deflect laser beams in quick succession, digital deflecting systems using the electro-optical effect with, e.g., ADP or KDP-crystals are suitable. Such systems are comparatively expensive anyway.

In order to increase redundancy, i.e., to increase the safety of storage against partial erasures, part of the storage, e.g, 25 % of the storage, may be in exclusive relation with 25 % of an other storage, which of course will involve a corresponding decrease of store capacity.

We claim:

1. OPtical readout apparatus comprising means for selectively producing a plurality of substantially pinpoint beams of substantially monochromatic light originating in a generally common plate, a collimating spheric lens element for each such light beam in coaxial relation to the beam axis and aving its focal plane substantially coinciding with the point of origination of the corresponding beam, a transparent information carrier for receiving the collimated light beams, said carrier comprising separate diffraction grating areas each in alignment with one of said collimated light beams and carrying thereon information differentiated in terms of at least one of a distinctive grating constant and aximuth angle, whereby said beams are each diffracted in a characteristic direction and angle relative to the beam axis, at least one focusing lens element for focusing the diffracted beams transmitted from the respective grating areas in a common plane spaced from the side of said focusing lens opposite to said carrier, and an array of photo-electric sensing devices disposed in said common plane at predetermined locations corresponding to the focal points of the respective diffracted light beams, whereby illumination of a given sensing device corresponds to information carried on a corresponding grating area.

2. The apparatus as in claim 1 wherein said collimating spheric lens element together form a common lens plate.

3. Apparatus as in claim 1 wherein said means for selectively producing said light beams comprises a cathode ray tube having a light screen and adjacent said screen a non-transparent mask penetrated by fine holes at spaced points thereon.

4. Apparatus as in claim 1 wherein between the light screen and the lens screen plate, there is provided a color filter for rendering the light from said cathode ray screen substantially monochromatic.

5. Apparatus as in claim 1 wherein the photo-electric sensing device includes photoresistors or photodiodes arranged in a predetermined pattern in a common plane, the distance separating adjacent photoresistors or photodiodes in said pattern being greater than the magnitude of any diffraction phenomena created by color dispersion and size of the light source.

6. Apparatus as in claim 5 wherein said points of beam origination are arranged around a common axis and the photoresistors or photodiodes are located at generally equi-spaced points lying on concentric circles around said common axis.

7. Apparatus as in claim 3 wherein each of the holes in said non-transparent mask is arranged concentrically to the optical axis of the corresponding collimating lens element.

8. A transparent information carrier comprising a support and a plurality of separate discrete diffraction grating areas of predetermined size and shape arranged in a predetermined pattern on said support, each such area being differentiated by at least one of a distinctive grating constant and azimuth angle according to information carried on said carrier.

9. Information carrier according to claim 8 wherein the respective grating areas are formed as phase gratings.

* * * * *